Figure 1:
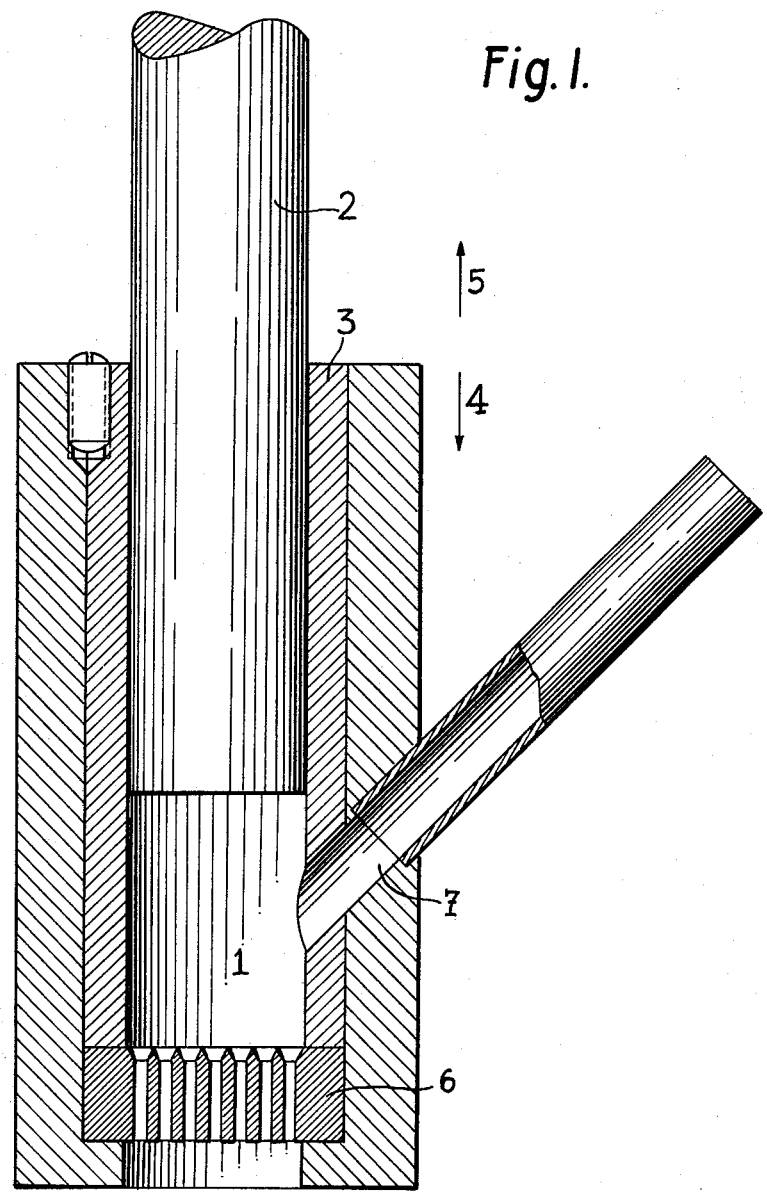

Fig. I.

INVENTORS
KURT RICHARD
HANS-EBERHARD HILDEBRANDT
BY
their ATTORNEYS

INVENTORS
*KURT RICHARD
HANS EBERHARD HILDEBRANDT*
BY
*Connolly and Hutz*
ATTORNEYS

United States Patent Office 3,004,294
Patented Oct. 17, 1961

3,004,294
PROCESS FOR THE MANUFACTURE OF
GRANULAR PRODUCTS
Kurt Richard, Bad Soden am Taunus, and Hans-Eberhard Hildebrandt, Hattersheim am Main, Germany, assignors to Farbwerke Hoechst Aktiengesellschaft vormals Meister Lucius & Brüning, Frankfurt am Main, Germany, a corporation of Germany
Filed Mar. 4, 1959, Ser. No. 797,257
Claims priority, application Germany Mar. 12, 1958
8 Claims. (Cl. 18—55)

The present invention relates to a process for the manufacture of granular products.

All substances capable of being molded under pressure can be granulated, i.e. made into particles of a defined shape and size. Many of these substances, for example thermoplastic artificial materials, are processed in a granular form. Various methods are used for granulating these materials.

Thermoplastic artificial materials are in general plasticized, i.e. melted, in an extruder or screw extruder. After having left the extruder, the plastic mass is made into a band by rolling, cooled and cut into square pieces in the cold state. It is also known to impress profiles on the plastic mass leaving the extrusion head. The profiles are then subdivided in a longitudinal direction while they are still warm or after they have cooled down.

This method of granulating necessitates complicated screw extruders which must be supplied with the energy required for moving and extruding the plastic mass and also with the amount of heat necessary for melting the thermoplastics. Furthermore, in the case of various substances, thermal stress must be substantially avoided. For example, thermoplastic artificial materials built up of chain molecules have a tendency to molecular decomposition under the action of heat whereby their properties are in general impaired. In the case of pulverulent mixtures of thermoplastic macromolecular substances and, for example, expanding agents undesired foam formation may occur during this known granulating process, due to the action of heat.

According to another proposal, the powder to be granulated is compressed between two mating gear wheels and enters the interior of the hollow gear wheels through boreholes provided in the gear wheels in the form of a compressed strand. When the strands leave the boreholes and enter the interior of the gear wheels, they are seized by strippers and divided. This process causes considerable loss of powder which can only be avoided to a certain extent by reducing the play of the gear wheels. It cannot be avoided in the case of mating gear wheels that a metallic abrasion forms due to the rolling motion of the gears which abrasion is strongly increased by a decrease in the play of the gear wheels and the consequently increased contact pressure. This metallic abrasion is very uneconomic in the case of various products, especially in the field of electrical engineering. In order to avoid the loss of powder in some other manner, it has been proposed to heat the gear wheels, for example, inductively or by means of steam.

Now, we have found that pulverulent substances capable of being molded by pressure, and preferably thermoplastic artificial materials of high molecular weight, can be granulated by making them into strands of defined cross-sections by forcing them by means of a piston through appropriate openings which are provided in a plate and are preferably arranged at equal distances from one another. The openings are furthermore arranged in a manner such that the ratio of the piston surface to the total area occupied by the individual openings is between about 1.2 and about 2.2, and preferably between 1.5 and 1.8. The process is carried out at temperatures ranging from room temperature to a temperature below the melting or softening point of the material to be granulated.

The process of the invention is based on the observation that the substances to be granulated can be compressed by means of an appropriate arrangement without being plasticized and without mechanical abrasion and losses of powder occurring.

Figure 2:
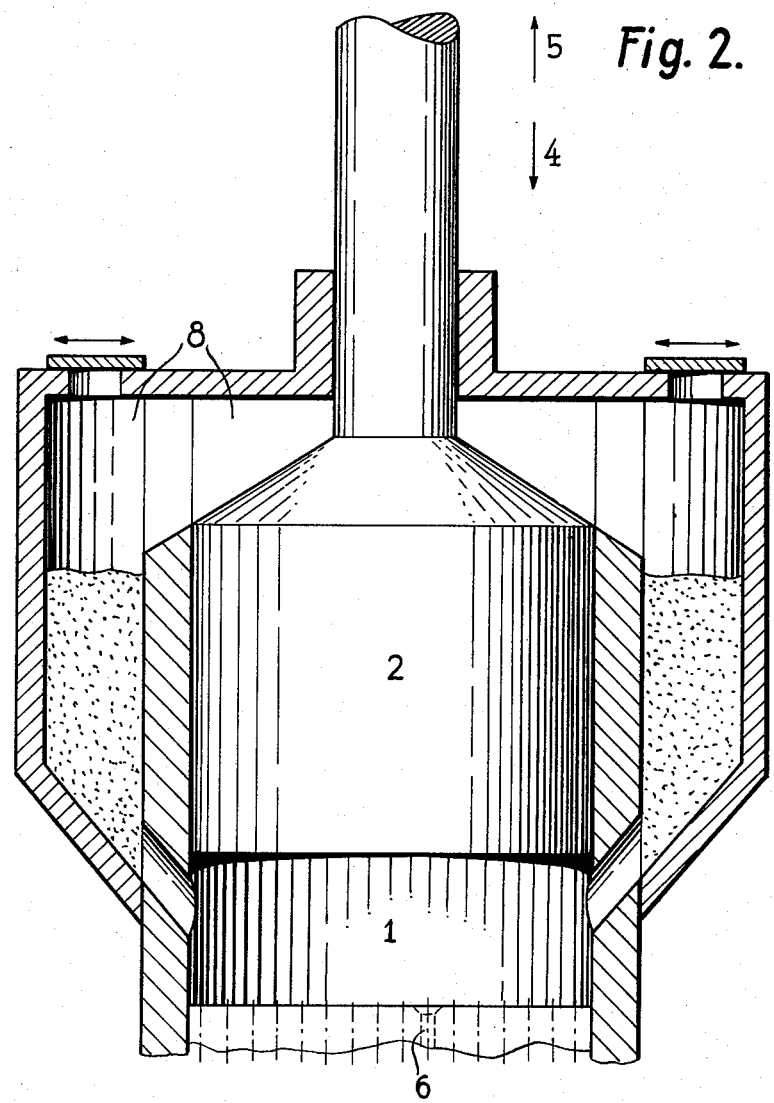
Figure 3:
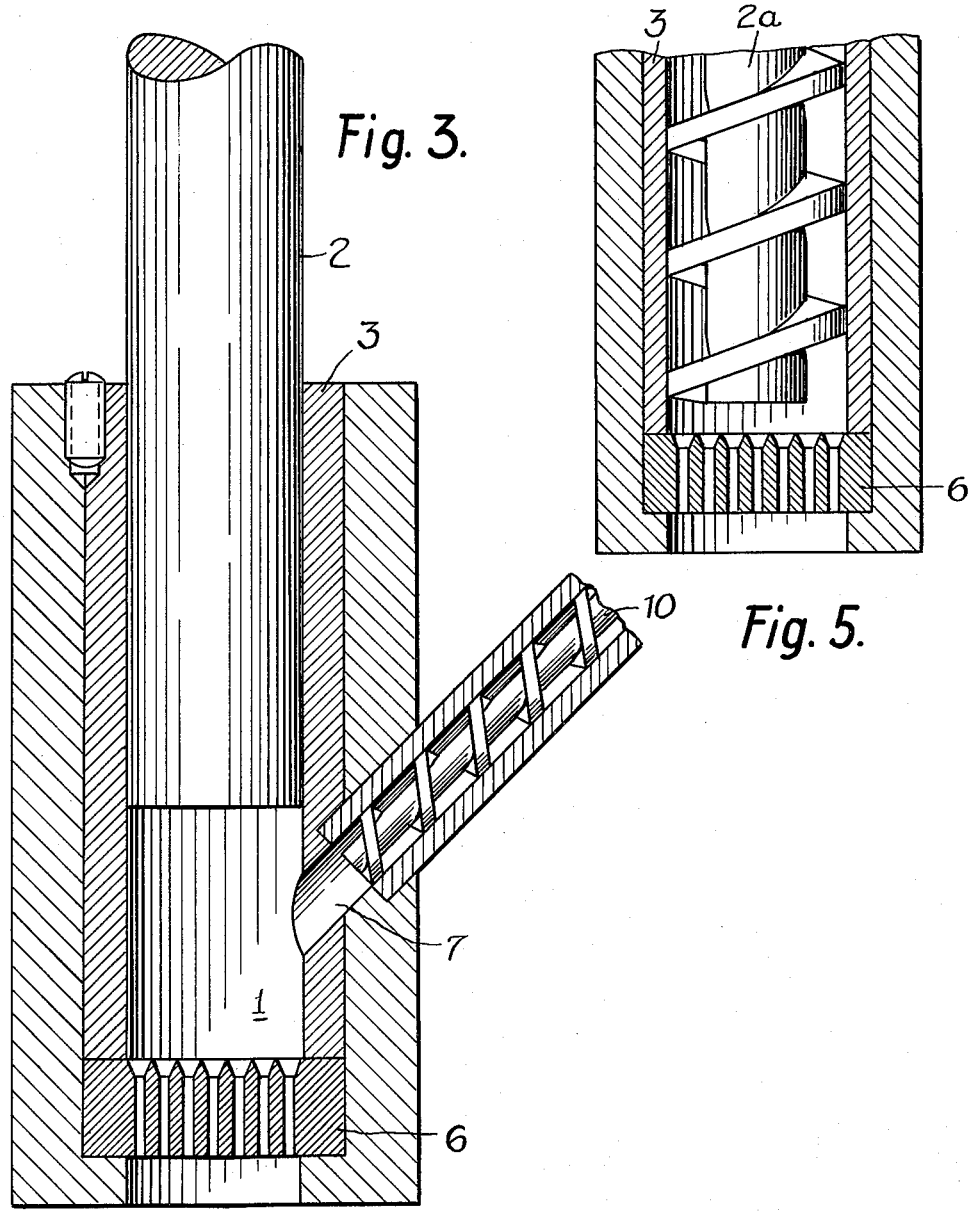
Figure 4:
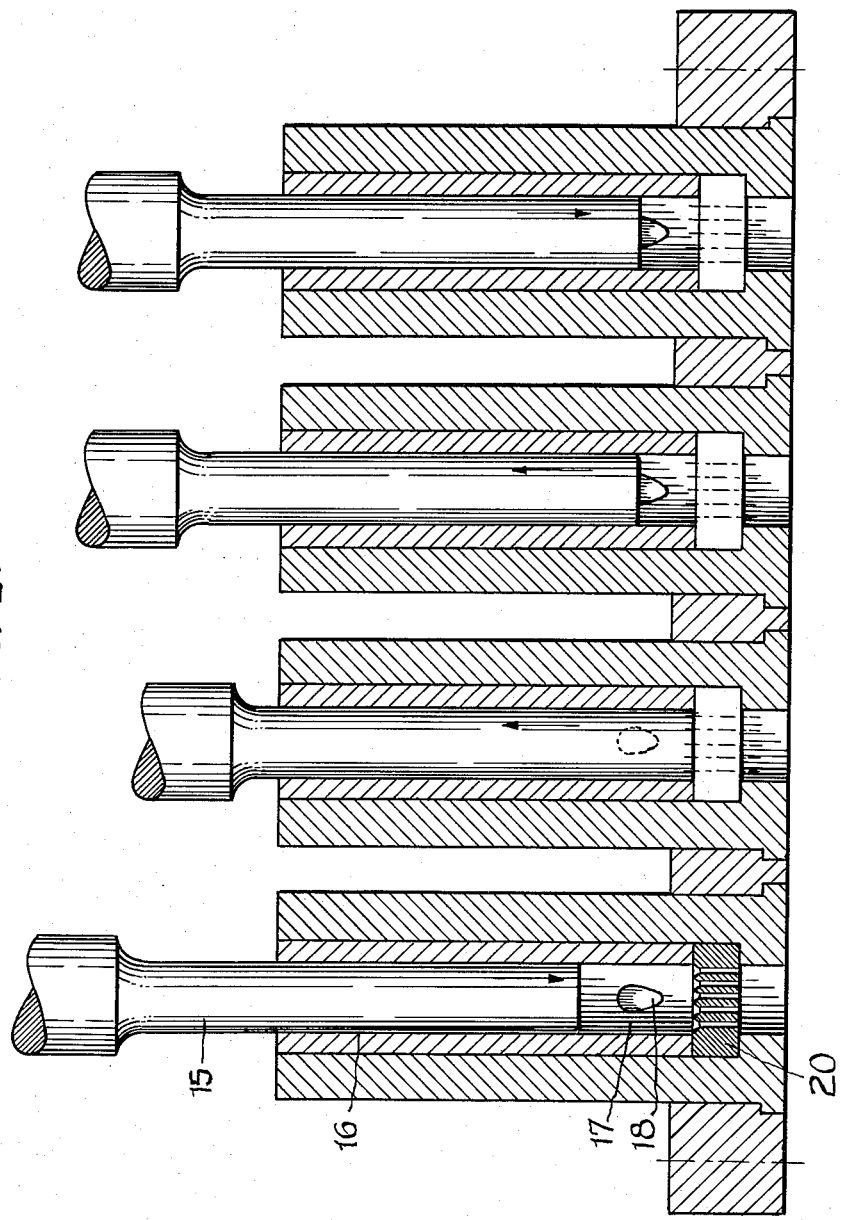

An apparatus suitable for use in carrying out the process of the invention is illustrated diagrammatically by way of example in the accompanying drawings. In these drawings, FIGURE 1 is a sectional elevation of a single extruder; FIGURE 2 is a detailed sectional elevation of another form of extruding device; FIGURE 3 is a sectional elevation of still another form of extruder; FIGURE 4 is a sectional elevation of a multiple form of extruders; and FIGURE 5 is a detailed elevation of a further form of extrusion nozzle.

Referring to FIG. 1 of the drawings, the powder is compressed in a hollow space 1 by means of a piston 2 which has a diameter of, for example, $D=14$ to 160 mm. and may be operated, for example, by a crankshaft. In order to avoid abrasion and improve the antifriction properties of the piston, the latter may be hardened. The piston moves to and fro in the direction of the double arrow 4, 5 in a bushing 3. To obtain a plurality of compressed strands of usual cross-section, the nozzle plate 6 which closes the powder compression chamber on one side is provided with a corresponding number of holes. It is, of course, also possible to provide the granulating apparatus with several powder compression chambers in which the pistons operate in the same or in different rhythm. This modification is illustrated in FIGURE 4 wherein a plurality of pistons 15 set in bushings 16 reciprocate so as to apply repeated pressure to a compression chamber 17, the latter having a feed orifice 18 which is alternately opened and closed by the reciprocation of piston 15, and a nozzle plate 20 containing a plurality of extrusion orifices.

The problem is to construct appropriate transition zones through which the material which is pushed forward by the piston of large cross-section is conducted into the individual channels of small diameters. These transition zones shall be constructed in a manner such that a uniform flow of material is ensured throughout the forward movement of the piston. On the other hand, the nozzle plate shall build up the pressure necessary for the compression. It has proved advantageous to construct the holes in plate 6 and the following metal webs so as to be wedge-shaped.

The powder compression chamber may be charged by means of the subatmospheric pressure formed by the reverse movement of the piston. After the exposure of one or more slits 7 provided in the wall of the compression cylinder, the powder is automatically sucked in from a storage container by the subatmospheric pressure. The application of the subatmospheric pressure is of importance since pulverulent substances often form bridges in channels which bridges prevent the powder from gliding down the channel. To produce the subatmospheric pressure, piston and sleeve are provided with an appropriate fit. If it should be necessary, for example in the case of large piston diameters, to increase the suction capacity, the storage chamber 8 for the powder may be constructed as air compression chamber (see FIG. 2). This chamber is filled with powder during the compression stroke (movement of the piston according to arrow 4). The powder is conveyed to the openings 6 by means of the air compressed by the reverse movement of piston 2 and by means of the vacuum formed in the powder compression chamber 1. It is also possible to feed the material to the openings in another way, for example in a purely mechanical manner by means of special conveying devices, such as a screw conveyor. This is illustrated in FIGURE 3 wherein an extrusion device otherwise identical with that of FIGURE 1 as to the operation of piston 2 is equipped with conveyor screw 10 in feeder pipe 7 to feed powder into compression chamber 1 for extrusion through the orifices in plate 6.

The strands leaving the nozzle plate may be cut off or sheared off in known manner. However, the process of the present invention even permits of a still simpler method of subdividing the strands. The stroke of the piston may be adjusted in a manner such that the length of strand forced out per stroke corresponds to the desired particle length. By subsequently bending the strands the latter are broken off at the positions sensitive to bending stress, that is to say the positions upon which the stroke acts.

The process of the invention is applicable to all substances capable of being molded under pressure, for example plastic or thermoplastic substances. The density obtained in the case of the thermoplastic substances is only slightly different from that of the molten material.

The process of this invention can be used, for example, for granulating pulverulent polyvinyl chloride, polytrifluorochlorethylene, polytetrafluorethylene and mixtures of these three substances with one another. It is, furthermore, applicable to the group of low pressure polyolefins comprising polyolefins, copolymers of olefins, mixtures of polyolefins, and the chlorination or sulfochlorination products or other reaction products thereof, either alone or in admixture with one another.

There may also be granulated mixtuers of the aforesaid polyolefins and other polymers, such as polyvinyl chloride, polytrifluorochlorethylene or polytetrachlorethylene. The process of the invention is not only applicable to pure polymers but also to mixtures of polymers with the substances usually added during the working up, for example, dyestuffs, pigments, stabilizers, processing auxiliary agents (lubricants, waxes of low molecular weight), carbon black annd plasticizers. The process can be applied with particular advantage to mixtures with additions that react under heat, for example cross-linking agents or foaming agents. These additions are intended to become active at extrusion temperature and polymers containing such additives could, therefore, not be granulated by the known melting/granulating processes.

The piston pressure to be applied in accordance with the invention depends on the nature of the material to be granulated and is of the order of 100 to 4000 kg./cm.$^2$, preferably 1000 to 1500 kg./cm.$^2$.

In another form of the process of the invention, an appropriate screw is used instead of the piston, the screw being charged in known manner with the material to be granulated. This modification is shown in FIGURE 5 wherein the piston 2 of FIGURE 1 has been replaced by a conveyor screw 2a. When proceeding in this manner, it is not necessary to suck in the material to be granulated by a suction cylinder.

The following examples serve to illustrate the invention but they are not intended to limit it thereto.

*Example 1*

Low pressure polyethylene having a melting index within the range of 0.2 to 0.5 (n red about 2.8 to 4.3) was granulated by means of a piston 28 mm. in diameter and a nozzle plate with 61 holes, each 3 mm. in diameter. The average piston velocity was about 22 m./min. A compact granular product was obtained.

*Example 2*

Low pressure polyethylene having a melting index within the range of 0.8 to 2.0 (n red about 2.2 to 2.6) was granulated by means of the piston and the nozzle plate described in Example 1. The average piston velocity was the same as that described in Example 1. A compact granular product was obtained.

*Example 3*

Low pressure polyethylene having a melting index within the range of 2.5 to 6.0 (n red about 1.8 to 2.2) was granulated by means of the piston and the nozzle plate described in Example 1. The average piston velocity was the same as that described in Example 1. A compact granular product was obtained.

*Example 4*

Low pressure polyethylene having a melting index within the range of 12.0 to 18.0 (n red about 1.6 to 1.8) was granulated by means of the piston and the nozzle plate described in Evample 1. The average piston velocity was the same as that described in Example 1. A compact granular product was obtained.

*Example 5*

Low pressure polypropylene of n red=8.3 was granulated by means of a piston 14 mm. in diameter and a nozzle plate with 7 holes, each 3 mm. in diameter. The average piston velocity was about 3.2 m./min. A compact granular product was obtained.

*Example 6*

Polyvinyl chloride (suspension polymer) having a K value of 68.5 was granulated by means of a piston 28 mm. in diameter and a nozzle plate with 61 holes, each 3.1 mm. in diameter. The average piston velocity was about 22 m./min. A compact granular product was obtained.

*Example 7*

Polyvinyl chloride (emulsion polymer) having a K value of 68.5 was granulated at an average piston velocity of about 22 m./min. by means of a piston 28 mm. in diameter and a nozzle plate with 61 holes, each 3.0 mm. in diameter. A compact granular product was obtained.

*Example 8*

Polytetrafluorethylene (suspension polymer) was granulated by means of a piston 14 mm. in diameter and a nozzle plate with 7 holes, each 3.1 mm. in diameter. The average piston velocity was about 3.2 m./min. A compact granular product was obtained.

*Example 9*

Polytetrafluorethylene (emulsion polymer) was granulated by means of a piston 14 mm. in diameter and a nozzle plate with 7 holes, each 3.0 mm. in diameter. The average piston velocity was about 3.2 m./min. A compact granular product was obtained.

*Example 10*

Low presure polyethylene having a melting index within the range of 0.2 to 0.5 was mixed with 2% carbon black. The mixture was granulated by means of a piston 28 mm. in diameter and a nozzle plate with 61 holes, each 3 mm. in diameter. The average piston velocity was about 22 m./min. and the presure of the piston was about 1400 kg./cm$^2$. A compact granular product having a density of 0.940 g./cm.$^3$ was obtained.

*Example 11*

A mixture of 98.47% of low pressure polyethylene having a melting index of 17.5, 0.03% of a commercial stabilizer, 0.4% of calcium stearate, 1% of titanium dioxide and 0.1% of a dyestuff was granulated by means of a piston 28 mm. in diameter and a nozzle plate with 61 holes, each 2.8 mm. in diameter. The average piston velocity was about 22 m./min. A compact granular product was obtained.

Example 12

A mixture intended for foaming and consisting of 96.97% of low pressure polyethylene having a melting index of 14.9, 0.03% of a commerical stabilizer and 3% of a commercial foaming agent was granulated by means of a piston 28 mm. in diameter and a nozzle plate with 61 holes, each 2.8 mm. in diameter. The average piston velocity was about 22 m./min. A compact granular product was obtained.

Example 13

A mixture of 94.5% of polyvinyl chloride (suspension polymer) and a total of 5.5% of different processing auxiliary agents was granulated by means of a piston 28 mm. in diameter and a nozzle plate with 61 holes, each 2.7 mm. in diameter. The average piston velocity was 8.8 m./min. A compact granular product was obtained.

We claim:

1. A process for granulating a powder-like non-metallic material which is capable of being molded by pressure to compact granular products in which the powder particles are welded together without the application of additional heat being necessary to soften the material which comprises pressing said material under a pressure of between 100 and 4000 kg./cm.$^2$ by a piston from a hollow space through a plate having a plurality of gaps, the ratio of the piston surface to the total area occupied by said gaps being between 1.2 and 2.2, the powder-like material being admitted to said hollow space by the action of said piston, the process being carried out at a temperature in the range between room temperature and a temperature below the softening point of the material.

2. The process of claim 1, wherein the stroke of the piston is adjusted in a manner such that the length of the strands of the compressed material pressed out by each stroke is the intended length of the particles.

3. The process of claim 1, wherein the powder-like material is conveyed to the hollow space by a subatmospheric pressure produced by the reverse movement of the piston.

4. The process of claim 1, wherein the powder-like material is conveyed to the hollow space by a conveyor screw.

5. A process for granulating a powder-like high molecular thermoplastic non-metallic material which is capable of being molded by pressure to compact granular products in which the powder particles are welded together without the application of additional heat being necessary to soften the material which comprises pressing said material under a pressure of between 100 and 4000 kg./cm.$^2$ by a piston from a hollow space through a plate having a plurality of gaps, the ratio of the piston surface to the total area occupied by said gaps being between 1.2 and 2.2, the powder-like material being admitted to said hollow space by the action of said piston, the process being carried out at a temperature in the range between room temperature and a temperature below the softening point of the material.

6. The process of claim 5, wherein the thermoplastic material is selected from the group consisting of polyvinyl chloride, polytrifluorochlorethylene, polytetrafluorethylene, polyethylene, polypropylene, a copolymer of ethylene and propylene, a chlorination product of an olefin polymer, a sulfochlorination product of an olefin polymer and mixtures thereof.

7. The process of claim 5, wherein the pressure of the piston is between 1000 and 1500 kg./cm.$^2$.

8. A process for granulating a powder-like non-metallic material which is capable of being molded by pressure to compact granular products in which the powder particles are welded together without the application of additional heat being necessary to soften the material which comprises pressing with a pressing surface said material under a pressure between 100 and 400 kg./cm.$^2$ from a hollow space through a plate having a plurality of gaps, the ratio of the pressing surface to the total area occupied by said gaps being between 1.2 and 2.2, the process being carried out at a temperature in the range between room temperature and a temperature below the softening point of the material.

References Cited in the file of this patent

UNITED STATES PATENTS

| | | |
|---|---|---|
| 1,205,710 | Cavagnaro | Nov. 21, 1916 |
| 2,096,529 | Sizer | Oct. 19, 1937 |
| 2,366,417 | MacMillin | Jan. 2, 1945 |
| 2,485,523 | Ashbaugh | Oct. 18, 1949 |
| 2,587,930 | Uschmann | Mar. 4, 1952 |